United States Patent
Tanaka

(10) Patent No.: US 9,028,942 B2
(45) Date of Patent: May 12, 2015

(54) FLUOROELASTOMER COMPOSITION AND MOLDED ARTICLE

(75) Inventor: Hiroyuki Tanaka, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 10 days.

(21) Appl. No.: 13/816,646

(22) PCT Filed: Aug. 11, 2011

(86) PCT No.: PCT/JP2011/068358
§ 371 (c)(1),
(2), (4) Date: Feb. 12, 2013

(87) PCT Pub. No.: WO2012/023485
PCT Pub. Date: Feb. 23, 2012

(65) Prior Publication Data
US 2013/0150503 A1    Jun. 13, 2013

(30) Foreign Application Priority Data
Aug. 20, 2010   (JP) .................................. 2010-185589

(51) Int. Cl.
| | | |
|---|---|---|
| *B32B 27/26* | (2006.01) | |
| *C08K 5/50* | (2006.01) | |
| *C08K 5/13* | (2006.01) | |
| *C09K 3/10* | (2006.01) | |
| *C08K 5/18* | (2006.01) | |
| *C08K 5/3447* | (2006.01) | |
| *C08K 5/524* | (2006.01) | |
| *C08L 27/16* | (2006.01) | |
| *C08L 79/04* | (2006.01) | |
| *C08K 5/00* | (2006.01) | |
| *C08K 5/136* | (2006.01) | |
| *C08K 3/22* | (2006.01) | |

(52) U.S. Cl.
CPC ... *C08K 5/13* (2013.01); *C08K 3/22* (2013.01); *C09K 3/1009* (2013.01); *C08K 5/18* (2013.01); *C08K 5/3447* (2013.01); *C08K 5/524* (2013.01); *C08L 27/16* (2013.01); *C08L 79/04* (2013.01); *C08K 5/005* (2013.01); *C08K 5/50* (2013.01); *C09K 2200/0417* (2013.01); *C08K 5/136* (2013.01)

(58) Field of Classification Search
None
See application file for complete search history.

(56) References Cited

U.S. PATENT DOCUMENTS

| | | |
|---|---|---|
| 5,371,143 A | 12/1994 | Novak et al. |
| 2006/0235140 A1 | 10/2006 | Tanaka et al. |

FOREIGN PATENT DOCUMENTS

| | | |
|---|---|---|
| EP | 0432911 A1 | 6/1991 |
| EP | 1 347 012 A2 | 9/2003 |
| JP | 3-185042 A | 8/1991 |
| JP | 5-279535 A | 10/1993 |
| JP | 10-120919 A | 5/1998 |
| JP | 2003-277563 A | 10/2003 |
| WO | 2004/094527 A1 | 11/2004 |
| WO | 2010/035782 A1 | 4/2010 |

OTHER PUBLICATIONS

International Preliminary Report on Patentability and Written Opinion of the International Searching Authority for PCT/JP2011/068358 dated Mar. 19, 2013.

*Primary Examiner* — Vu A Nguyen
(74) *Attorney, Agent, or Firm* — Sughrue Mion, PLLC

(57) ABSTRACT

The present invention is to provide a fluoroelastomer composition which can suppress generation of unvulcanized portions even when a quaternary phosphonium salt is used as a vulcanization accelerator. Specifically, the present invention is a fluoroelastomer composition containing a polyol-crosslinkable fluoroelastomer, a polyhydroxy aromatic compound, a quaternary phosphonium salt, a divalent metal oxide and/or divalent metal hydroxide and an antioxidant.

6 Claims, No Drawings

FLUOROELASTOMER COMPOSITION AND MOLDED ARTICLE

CROSS REFERENCE TO RELATED APPLICATIONS

This application is a National Stage of International Application No. PCT/JP2011/068358 filed Aug. 11, 2011, claiming priority based on Japanese Patent Application No. 2010-185589 filed Aug. 20, 2010, the contents of all of which are incorporated herein by reference in their entirety.

TECHNICAL FIELD

The present invention relates to a fluoroelastomer composition and a molded article.

BACKGROUND ART

Patent Literature 1 discloses a fluoroelastomer vulcanizing composition characterized in that it comprises (a) a peroxide vulcanizable fluoroelastomer, (b) an organic peroxide, (c) a multi-functional co-crosslinking agent and (d) a phenolic antioxidant which contains per molecule 1 to 4 hydroxyphenyl groups having 1 or 2 tert-butyl groups. It also discloses that sealing components such as O-rings formed with the fluoroelastomer vulcanizing composition have significantly improved heat and aging resistance and sealing performance at high temperatures, so that they can retain the sealing performance for a prolonged period of time.

Known fluoroelastomers include, in addition to the peroxide vulcanizable fluoroelastomer disclosed in Patent Literature 1, polyol-crosslinkable fluoroelastomers. The polyol-crosslinkable fluoroelastomers are applied to many fields because of their small compression set and superior moldability among other fluoroelastomers.

Quaternary onium salts such as quaternary phosphonium salts and quaternary ammonium salts are used as vulcanization accelerators for polyol-crosslinking.

CITATION LIST

Patent Literature

Patent Literature 1: Japanese Patent Application Laid-open No. H5-279535

SUMMARY OF INVENTION

Technical Problem

It is advantageous to use a quaternary phosphonium salt as a vulcanization accelerator for production of sealing components from fluoroelastomers because sealing performance is improved compared to the ones obtained with using a quaternary ammonium salt as a vulcanization accelerator. However, the use of a quaternary phosphonium salt as a vulcanization accelerator has a drawback such that defects due to generation of unvulcanized portions may easily occur.

An object of the present invention is to provide a fluoroelastomer composition which can suppress generation of unvulcanized portions even when a quaternary phosphonium salt is used as a vulcanization accelerator.

Solution to Problem

As a result of extensive studies, the present inventor has found that the drawback of the use of a quaternary phosphonium salt as a vulcanization accelerator, i.e., generation of unvulcanized portions can be suppressed when an antioxidant which is added in order to prevent degradation of general purpose rubbers is used, thereby completing the present invention. Antioxidants are generally added to general purpose rubbers because the rubbers are easily degraded due to sunlight, oxygen, ozone, heat and the like. On the other hand, antioxidants are not added to fluororubbers because the fluororubbers have naturally excellent weather resistance and heat resistance. The present invention has been completed by reversing such a common knowledge.

Namely, the present invention is a fluoroelastomer composition characterized in that it comprises a polyol-crosslinkable fluoroelastomer, a polyhydroxy aromatic compound, a quaternary phosphonium salt, a divalent metal oxide and/or divalent metal hydroxide and an antioxidant.

The antioxidant is preferably at least one selected from the group consisting of amine-based antioxidants, phenolic antioxidants, phosphite antioxidants and benzimidazole-based antioxidants.

The polyhydroxy aromatic compound is preferably 2,2-bis(4-hydroxyphenyl)perfluoropropane.

The quaternary phosphonium salt is preferably at least one selected from the group consisting of benzyltriphenylphosphonium chloride and 2,2-bis(4-hydroxyphenyl)perfluoropropane salt of benzyltriphenylphosphonium.

The antioxidant is preferably contained at less than 0.5 parts by mass relative to 100 parts by mass of the fluoroelastomer.

The present invention is also a molded article characterized in that it is obtained with the above fluoroelastomer composition. The molded article may be a sealing material.

Advantageous Effects of Invention

The fluoroelastomer composition of the present invention comprises a quaternary phosphonium salt as a vulcanization accelerator, so that it can provide, after vulcanization thereof, a sealing component having excellent sealing performance. In addition, molding defects due to generation of unvulcanized portions can be suppressed which have been a drawback of use of a quaternary phosphonium salt.

DESCRIPTION OF EMBODIMENTS

The present invention is specifically described hereinbelow.

The fluoroelastomer composition of the present invention comprises (1) a polyol-crosslinkable fluoroelastomer, (2) a polyhydroxy aromatic compound, (3) a quaternary phosphonium salt, (4) a divalent metal oxide and/or divalent metal hydroxide and (5) an antioxidant.

(1) Polyol-Crosslinkable Fluoroelastomer

The polyol-crosslinkable fluoroelastomer is not particularly limited and may be any fluoroelastomer having a polyol-crosslinkable moiety. The polyol-crosslinkable moiety may include, but not limited to, for example, a moiety containing a vinylidene fluoride (VdF) unit.

The polyol-crosslinkable fluoroelastomer is preferably a copolymer containing VdF units in terms of heat resistance, compression set, processability and cost.

The copolymer containing VdF units is preferably a copolymer containing VdF units and repeating units based on a fluorine-containing ethylenic monomer (except for VdF units). It is also preferable that the copolymer containing VdF units further contains repeating units derived from a monomer copolymerizable with VdF and a fluorine-containing ethylenic monomer.

The copolymer containing VdF units preferably contains 30 to 85% by mole of VdF units and 70 to 15% by mole of repeating units derived from a fluorine-containing ethylenic monomer and more preferably 30 to 80% by mole of VdF units and 70 to 20% by mole of repeating units derived from a fluorine-containing ethylenic monomer. The repeating unit derived from a monomer copolymerizable with VdF and a fluorine-containing ethylenic monomer is preferably, relative to the total amount of VdF units and the repeating units derived from a fluorine-containing ethylenic monomer, at 0 to 40% by mole, more preferably 0 to 30% by mole, still more preferably 0 to 20% by mole and particularly preferably 0 to 10% by mole.

The fluorine-containing ethylenic monomer may include, for example, fluoromonomers such as tetrafluoroethylene (TFE), chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, fluoro(alkyl vinyl ethers), vinyl fluoride and the like, among which at least one selected from the group consisting of TFE, HFP and fluoro(alkyl vinyl ethers) is preferable.

The fluoro(alkyl vinyl ether) is preferably at least one selected from the group consisting of the general formula (1):

$$CF_2=CFO(CF_2CFY^1O)_p-(CF_2CF_2CF_2O)_q-Rf \qquad (1)$$

(wherein $Y^1$ represents F or $CF_3$; Rf represents a perfluoroalkyl radical having 1 to 5 carbon atoms; p represents an integer of 0 to 5; and q represents an integer of 0 to 5) and the general formula (2):

$$CFX=CXOCF_2OR \qquad (2)$$

(wherein X represents H, F or $CF_3$; and R represents a linear or branched fluoroalkyl radical having 1 to 6 carbon atoms or a cyclic fluoroalkyl radical having 5 to 6 carbon atoms).

R in the general formula (2) may be a fluoroalkyl radical containing one or two atoms of at least one type selected from the group consisting of H, Cl, Br and I.

The fluoro(alkyl vinyl ether) is preferably a perfluoroalkylvinylether (PAVE), more preferably perfluoro(methyl vinyl ether), perfluoro(ethyl vinyl ether) or perfluoro(propyl vinyl ether) and still more preferably perfluoro(methyl vinyl ether). These can be used alone or in any combination.

The monomer copolymerizable with VdF and a fluorine-containing ethylenic monomer may include, for example, ethylene, propylene, alkyl vinyl ethers (except for the ones containing a fluorine atom) and the like.

The copolymer containing VdF units may preferably be one or two or more of VdF/HFP copolymers, VdF/HFP/TFE copolymers, VdF/CTFE copolymers, VdF/CTFE/TFE copolymers, VdF/HFP/PAVE copolymers, VdF/HFP/TFE/PAVE copolymers, VdF/propylene/TFE copolymers and the like. Among these copolymers containing VdF units, in terms of heat resistance, compression set, processability and cost, it is preferably at least one selected from the group consisting of VdF/HFP copolymers, VdF/HFP/TFE copolymers, VdF/HFP/PAVE copolymers and VdF/HFP/TFE/PAVE copolymers and more preferably at least one selected from the group consisting of VdF/HFP copolymers and VdF/HFP/TFE copolymers.

The VdF/HFP copolymer preferably has the VdF/HFP molar ratio of 45 to 85/55 to 15, more preferably 50 to 80/50 to 20 and still more preferably 60 to 80/40 to 20.

The VdF/HFP/TFE copolymer preferably has the VdF/HFP/TFE molar ratio of 40 to 80/10 to 35/10 to 35.

The VdF/HFP/PAVE copolymer preferably has the VdF/HFP/PAVE molar ratio of 65 to 90/3 to 25/3 to 25.

The VdF/HFP/TFE/PAVE copolymer preferably has the VdF/HFP/TFE/PAVE molar ratio of 40 to 90/0 to 25/0 to 40/3 to 35 and more preferably 40 to 80/3 to 25/3 to 40/3 to 25.

The polyol-crosslinkable fluoroelastomer preferably has the fluorine content of 50% by mass or more, more preferably 60% by mass or more and still more preferably 65% by mass or more. The upper limit of the fluorine content is not specifically limited and is preferably 74% by mass or less. When the fluorine content is too low, chemical resistance, fuel oil resistance and low fuel permeability may be deteriorated.

The monomer composition of the polyol-crosslinkable fluoroelastomer can be measured by $^{19}$F-NMR and the fluorine content thereof can be calculated from the polymer composition measured by $^{19}$F-NMR.

The polyol-crosslinkable fluoroelastomer preferably has, in terms of preferable processability, the Mooney viscosity ($ML_{1+10}$ (121° C.)) of 5 to 140, more preferably 10 to 120 and still more preferably 20 to 100.

The Mooney viscosity ($ML_{1+10}$ (100° C.)) is preferably 10 to 200, more preferably 20 to 150 and still more preferably 30 to 100.

The Mooney viscosity can be measured according to ASTM-D1646 and JIS K6300.

Measurement instrument: Type MV2000E from ALPHA TECHNOLOGIES
Rotor speed: 2 rpm
Measurement temperature: 121° C. or 100° C.

The polyol-crosslinkable fluoroelastomer preferably has the number average molecular weight of 20,000 to 1,200,000, more preferably 30,000 to 300,000 and still more preferably 50,000 to 200,000.

The polyol-crosslinkable fluoroelastomer preferably has the glass transition temperature of 5° C. or lower and more preferably 0° C. or lower.

The glass transition temperature can be determined by subjecting 10 mg of a polymer to the measurement on the DSC from METTLER TOLEDO at a temperature range of −50 to 150° C. with the heating speed of 10° C./min under the second scan condition to measure the heat balance and calculating the glass transition temperature from two detected points of inflection based on the midpoint method.

(2) Polyhydroxy Aromatic Compound

The fluoroelastomer composition of the present invention comprises, as a polyol-vulcanization agent, a polyhydroxy aromatic compound. The polyhydroxy aromatic compound is not particularly limited and may include, for example, 2,2-bis(4-hydroxyphenyl)propane (hereinafter referred to as bisphenol A), 2,2-bis(4-hydroxyphenyl)perfluoropropane (hereinafter referred to as bisphenol AF), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as bisphenol B), 4,4-bis(4-hydroxyphenyl)valeric acid, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A, 3,3',5,5'-tetrabromobisphenol A and the like. The polyhydroxy aromatic compound may also be alkali metal salts, alkaline earth metal salts and the like.

Among these, bisphenol AF is preferable because it has excellent heat resistance.

The content of the polyhydroxy aromatic compound is preferably, relative to 100 parts by mass of the fluoroelastomer, 0.2 to 10 parts by mass, more preferably 0.5 to 6 parts by mass and still more preferably 1 to 3 parts by mass. When the content of the polyhydroxy aromatic compound is less than 0.2 parts by mass, the crosslinking density may be too low and the compression set may be increased; and when it is more than 10 parts by mass, the crosslinking density is excessively high, so that cracks may be produced upon compression.

(3) Quaternary Phosphonium Salt

The fluoroelastomer composition of the present invention comprises as a vulcanization accelerator a quaternary phosphonium salt. The quaternary phosphonium salt is not particularly limited and may include, for example, tetrabutylphosphonium chloride, benzyltriphenylphosphonium chloride (hereinafter referred to as BTPPC), 2,2-bis(4-hydroxyphenyl) perfluoropropane salt of benzyltriphenylphosphonium, benzyltrimethylphosphonium chloride, benzyltributylphosphonium chloride, tributylallylphosphonium chloride, tributyl-2-methoxypropylphosphonium chloride, benzylphenyl (dimethylamino)phosphonium chloride and the like. Among these, benzyltriphenylphosphonium chloride (BTPPC) and 2,2-bis(4-hydroxyphenyl)perfluoropropane salt of benzyltriphenylphosphonium are preferred because they have excellent crosslinking property and can provide crosslinked fluororubbers having excellent physical properties.

The content of the quaternary phosphonium salt is preferably, relative to 100 parts by mass of the fluoroelastomer, 0.1 to 5.0 parts by mass, more preferably 0.2 to 2.0 parts by mass and still more preferably 0.3 to 1.5 parts by mass. When the content of the quaternary phosphonium salt is less than 0.1 parts by mass, crosslinking speed may be decreased to affect the productivity; and when the content is more than 5.0 parts by mass, crosslinking speed may be excessively increased to increase the frequency of generation of scorch and molding defects or compression set may be deteriorated.

A solid solution between a quaternary phosphonium salt and bisphenol AF and a compound disclosed in Japanese Patent Application Laid-open No. H11-147891 may also be used.

(4) Divalent Metal Oxide and/or Divalent Metal Hydroxide

The fluoroelastomer composition of the present invention comprises as an acid receptor a divalent metal oxide and/or divalent metal hydroxide. The divalent metal oxide and/or divalent metal hydroxide may include, for example, oxides and hydroxides of magnesium, calcium, zinc, lead and the like. The divalent metal oxide and/or divalent metal hydroxide is preferably one or both of magnesium oxide and calcium hydroxide.

The divalent metal oxide and/or divalent metal hydroxide is preferably contained, relative to 100 parts by mass of the polyol-crosslinkable fluoroelastomer, at 1 to 20 parts by mass.

(5) Antioxidant

The fluoroelastomer composition of the present invention comprises an antioxidant. The antioxidant may include amine-based antioxidants, phenolic antioxidants, phosphite antioxidants, benzimidazole-based antioxidants and the like.

The amine-based antioxidant may include, for example, amine-ketone based antioxidants, aromatic secondary amines, thioureas, organic thio acids, dithiocarbamic acid-based antioxidants and the like.

The amine-ketone based antioxidants may include 2,2,4-trimethyl-1,2-dihydroquinoline polymer, 6-ethoxy-2,2,4-trimethyl-1,2-dihydroquinoline, reaction products of diphenylamine and acetone, reaction products of aniline and acetone and the like.

The aromatic secondary amine may include alkylated diphenylamines such as octylated diphenylamine, di-tert-butyl-diphenylamine and the like, 4,4'-bis(α,α'-dimethylbenzyl)diphenylamine (=4,4'-dicumyl-diphenylamine), styrenated diphenylamine, p-(p-toluenesulfonylamide) diphenylamine, N-phenyl-N'-(3-methacryloyloxy-2-hydroxypropyl)-p-phenylene diamine, N-phenyl-1-naphthylamine, N-isopropyl-N'-phenyl-p-phenylenediamine, N,N'-diphenyl-p-phenylenediamine, N,N'-di-2-naphthyl-p-phenylenediamine, N-(1,3-dimethylbutyl)-N'-phenyl-p-phenylenediamine, N-(1-methylheptyl)-N'-phenyl-p-phenylenediamine, N,N'-methylene-bis-acrylamide, phenothiazine derivatives and the like.

The thiourea may include 1,3-bis(dimethylaminopropyl)-2-thiourea, tributylthiourea and thiourea derivatives represented by $R^1R^2NC(=S)NR^3R^4$ (wherein $R^1$ to $R^4$ are selected from hydrogen, an alkyl group, an alkoxy group, an alkyl group substituted with an alkylamino or dialkylamino group, a cycloalkyl group and a phenyl group).

The thiourea derivative may include, for example, 1,3-diethyl-2-thiourea, 1,3-dibutyl-2-thiourea, 1-methoxypropyl-3-oxydiethylene-2-thiourea, 1-n-butyl-3-oxydiethylene-2-thiourea, ethylene thiourea (2-mercaptoimidazoline), 1-methoxypropyl-3-butyl-2-thiourea, 1-dimethyaminopropyl-3-butyl-2-thiourea, 1-methoxypropyl-3-cyclohexyl-2-thiourea, 1-dimethylaminopropyl-3-phenyl-2-thiourea, 1-diethylaminopropyl-3-oxydiethylene-2-thiourea, 1-methoxypropyl-3,3-dibutyl-2-thiourea, 1-dimethylaminopropyl-3,3-diisopropyl-2-thiourea, 1-diethylaminopropyl-3-methyl-3-cyclohexyl-2-thiourea, 1-methoxypropyl-3-phenyl-3-cyclohexyl-2-thiourea and the like.

The organic thio acid may include dilauryl thiodipropionate and the like.

The dithiocarbamic acid-based antioxidant may include nickel dibutyldithiocarbamate and the like.

The phenolic antioxidant may include, for example, monophenolic antioxidants, bisphenolic antioxidants, polyphenolic antioxidants and the like.

The monophenolic antioxidant may include 2,6-di-tert-butyl-4-methylphenol, (α-methylbenzyl)phenol, di(α-methylbenzyl)phenol, tri(α-methylbenzyl)phenol, styrenated phenol and the like.

The bisphenolic antioxidant may include 4,4'-butylidene bis(3-methyl-6-tert-butylphenol), butylated product of p-cresol and dicyclopentadiene, 4,4'-thio-bis(3-methyl-6-tert-butylphenol), 2,2'-methylene-bis(4-alkyl-6-tert-butylphenols) such as 2,2'-methylene-bis(4-methyl-6-tert-butylphenol), 2,2'-methylene-bis(4-ethyl-6-tert-butylphenol) and the like, 2,2'-methylene-bis[6-(1-methylcyclohexyl-p-cresol)], 2,2'-dihydroxy-3,3'-di(α-methylcyclohexyl)-5,5'-dimethyldi phenylmethane and the like.

The polyphenolic antioxidant may include 2,5-di-tert-alkylhydroquinones such as 2,5-di-tert-amylhydroquinone, 2,5-di-tert-butylhydroquinone and the like.

The phosphite antioxidant may include tris(nonylphenyl) phosphite and the like.

The benzimidazole-based antioxidant may include 2-mercaptobenzimidazole, 2-mercaptobenzimidazole zinc salt, 2-mercaptomethylbenzimidazole and the like.

The antioxidant may include, in addition to those exemplified above, butylhydroxyanisole and the like.

The antioxidant is preferably at least one selected from the group consisting of amine-based antioxidants, phenolic antioxidants, phosphite antioxidants and benzimidazole-based antioxidants and more preferably is a phenolic antioxidant and still more preferably is at least one selected from the group consisting of 2,6-di-tert-butyl-4-methylphenol, 2-tert-butyl-4-methoxyphenol, 2,2,4-trimethyl-1,2-dihydroquinoline polymer, 2,2'-methylene-bis(4-methyl-6-tert-butylphenol), 2,2'-methylene-bis(4-ethyl-6-tert-butylphenol), 4,4'-butylidene bis(3-methyl-6-tert-butylphenol), 4,4'-thiobis(3-methyl-6-tert-butylphenol), 2,5-di-tert-butylhydroquinone and 2,5-di-tert-amylhydroquinone.

The antioxidant is preferably solid at room temperature and has a melting point of 200° C. or lower because it is easy to handle and is easily dispersed in the polyol-crosslinkable fluoroelastomer.

The antioxidant is preferably contained, relative to 100 parts by mass of the polyol-crosslinkable fluoroelastomer, less than 1 part by mass and more preferably less than 0.5 parts by mass in terms of adverse effect on the properties (particularly elongation at break and compression set) of the final products, i.e., sealing materials. The lower limit is not particularly limited and may be 0.01 parts by mass, preferably 0.05 parts by mass and more preferably 0.10 parts by mass.

Optionally, conventional additives used for fluoroelastomers can further be contained including various additives such as fillers, processing aids, plasticizers, colorants, stabilizers, adhesion aids, mold release agents, surface anti-adhesive agents, flame retardants and the like. One or more of conventional vulcanization agents and vulcanization accelerators which are different from those described above may also be included.

The fluoroelastomer composition of the present invention is obtained by kneading the polyol-crosslinkable fluoroelastomer, the polyhydroxy aromatic compound, the quaternary phosphonium salt, the divalent metal oxide and/or divalent metal hydroxide, the antioxidant and other components such as fillers in a conventional rubber kneading machine. The rubber kneading machine which can be used is a roll, a kneader, a banbury mixer, an internal mixer, a twin screw extruder and the like.

Dispersibility can be further improved by leaving the kneaded fluoroelastomer composition at room temperature for 12 hours or more and kneading it again.

A molded article characterized in that it is obtained with the fluoroelastomer composition of the present invention is also encompassed by the present invention.

The molded article of the present invention is produced by molding and crosslinking the fluoroelastomer composition. The crosslinking conditions may be appropriately selected according to the type of the polyhydroxy aromatic compound and the like and generally include primary crosslinking at a temperature of 100 to 200° C. for 5 to 60 minutes and optional secondary crosslinking/baking.

The method of crosslinking can be conventional methods such as pressure crosslinking, steam crosslinking as well as methods under any crosslinking conditions such as normal, increased or reduced pressure and in air.

The molded article of the present invention has chemical resistance, oil resistance and heat resistance in combination and therefore is useful as sealing materials, fuel hoses, particularly sealing materials and fuel hoses for automotive engines and peripheral devices, AT devices, fuel systems and peripheral devices and the like.

For example, gaskets, shaft seals, valve stem seals and sealing materials can be used for engines and peripheral devices, sealing materials can be used for AT devices, O (square)-rings, packings, sealing materials and diaphragms can be used for fuel systems and peripheral devices. Specifically, the molded article can be used as engine head gaskets, metal gaskets, oil pan gaskets, crankshaft seals, camshaft seals, valve stem seals, manifold packings, seals for oxygen sensors, injector O-rings, injector packings, fuel pump O-rings, diaphragms, crankshaft seals, gearbox seals, power piston packings, seals for cylinder liners, seals for valve stems, automatic transmission front pump seals, rear axle pinion seals, universal joint gaskets, speedometer pinion seals, piston cups for foot brakes, torque transmission O-rings, oil seals, seals for exhaust gas afterburners, bearing seals, diaphragms for carburetor sensors and the like.

In the semiconductor manufacturing fields, in the semiconductor fields related to semiconductor manufacturing apparatus, liquid crystal panel manufacturing apparatus, plasma panel manufacturing apparatus, plasma addressed liquid crystal panels, field emission display panels, solar cell substrates and the like, O (square)-rings, packings, sealing materials, gaskets, diaphragms may be mentioned, which can be used for CVD devices, dry etching devices, wet etching devices, oxidation/diffusion devices, sputtering devices, ashing devices, cleaning devices, ion implantation devices and exhaust devices. Specifically, the molded article can be used as O-rings and sealing materials for gate valves, O-rings and sealing materials for quartz windows, O-rings and sealing materials for chambers, O-rings and sealing materials for gates, O-rings and sealing materials for bell jars, O-rings and sealing materials for couplings, O-rings, sealing materials and diaphragms for pumps, O-rings and sealing materials for semiconductor gas controllers, O-rings for resist developers and strippers.

In the fields of aircrafts, rockets and ship, diaphragms, O (square)-rings, valves, packings, sealing materials and the like may be mentioned, which can be used for fuel systems. Specifically, the molded article may be used as, in the field of aircrafts, jet engine valve stem seals, gaskets and O-rings, rotating shaft seals, gaskets for hydraulic machines, seals for fire protection walls and the like; and in the field of ship, stern propeller shaft screw seals, inlet/outlet valve stem seals for diesel engines, valve seals for butterfly valves, shaft seals for butterfly valves and the like.

In the field of chemicals such as plants, valves, packings, diaphragms, O (square)-rings, sealing materials and the like may be mentioned, which can be used for chemical production processes such as medicines, agrichemicals, paints, resins and the like. Specifically, the molded article can be used as seals for pumps for chemicals, flowmeters and piping, seals for heat exchangers, glass condenser packings for sulfuric acid production apparatus, seals for agrichemical sprayers and agrichemical transport pumps, seals for gas piping, seals for plating solution, packings for high-temperature vacuum dryers, koroseals for paper manufacturing belts, seals for fuel cells, joint seals for wind tunnels, packings for gas chromatography and pH meter tube joints, seals, diaphragms and valves for analytical instruments and physical and chemical science devices and the like.

In the fields of photography including developers, of printing including printing machines and of paints including painting apparatus, the molded article can be used as seals and valves for xerographic devices.

In the field of food plant apparatus, valves, packings, diaphragms, O (square)-rings, sealing materials may be mentioned, which can be used for food production processes. Specifically, the molded article can be used as seals for plate heat exchangers, electromagnetic valve seals for vending machines and the like.

In the field of atomic power plant apparatus, packings, O-ring, sealing materials, diaphragms, valves and the like may be mentioned.

In the field of general industries, packings, O-rings, sealing materials, diaphragms, valves and the like may be mentioned. Specifically, the molded article can be used as seals for hydraulic and lubrication machines, bearing seals, seals for windows and other parts of dry cleaning apparatus, seals for uranium hexafluoride enrichment apparatus, seal (vacuum) valves for cyclotrons, seals for automatic packaging machines, diaphragms for pumps for analyzing sulfite gas and chlorine gas in air (pollution analyzers) and the like.

In the electric field, the molded article may be specifically used as insulating oil caps for bullet trains, benching seals for liquid-sealed transmissions and the like.

In the field of fuel cells, the molded article may be specifically used as sealing materials between electrodes or separators, seals for piping for hydrogen, oxygen, produced water and the like.

In the field of electric components, the molded article may be specifically used as materials for heat release materials, materials for electromagnetic shielding materials, gaskets for computer hard disk drives and the like.

The ones which can be used for on-site molding are not particularly limited and may include, for example, gaskets for engine oil pans, gaskets for magnetic recording devices, sealing materials for clean room filter units and the like.

The molded article is particularly suitably used as gaskets for magnetic recording devices (hard disk drives), sealing materials for clean facilities such as sealing materials for storages of semiconductor manufacturing apparatus and devices including wafers.

The molded article is also particularly suitably used as (taking advantage of its properties such as chemical resistance, low gas permeability, flame retardancy and the like) sealing materials for fuel cells such as packings used between fuel cell electrodes and peripheral pipings.

EXAMPLES

The present invention is now described by referring to Examples and Comparative Examples. However, the present invention is not limited to these Examples.

The specific reagents used in Examples and Comparative Examples are as follows.

Fluoroelastomer A: polyol-crosslinkable fluoroelastomer copolymer (VdF/HFP=78/22 (% by mole)), fluorine content: 66% by mass, Mooney viscosity $ML_{1+10}$ (100° C.) 45.

Fluoroelastomer B: polyol-crosslinkable fluoroelastomer-terpolymer (VdF/HFP/TFE=61/18/21 (% by mole)), fluorine content: 68.5% by mass, Mooney viscosity $ML_{1+10}$ (100° C.): 65.

2,2-Bis(4-hydroxyphenyl)perfluoropropane (bisphenol AF): from Daikin Industries, Ltd.

Benzyltriphenylphosphonium chloride (BTPPC): from Hokko Chemical Industry Co., Ltd.

Magnesium oxide: magnesium oxide (MA150) from Kyowa Chemical Industry Co., Ltd.

Calcium hydroxide: calcium hydroxide (CALDIC #2000) from Omi Chemical Industry Co., Ltd.

Carbon black: carbon black (N990) from Cancarb

Antioxidants (A) BHT (2,6-di-tert-butyl-4-methyl phenol): Antage BHT from Kawaguchi Chemical Industry Co., Ltd.

(B) TMDQ: (2,2,4-trimethyl-1,2-dihydroquinoline polymer): Antage RD from Kawaguchi Chemical Industry Co., Ltd.

(C) MBMBP: (2,2'-methylene-bis(4-methyl-6-tert-butylphenol)): Nocrac NS-6 from Ouchi Shinko Chemical Industrial Co., Ltd.

(D) DPPD: (N,N'-diphenyl-p-phenylenediamine): Nocrac DP from Ouchi Shinko Chemical Industrial Co., Ltd.

(E) MBI: (2-mercaptobenzimidazole): Nocrac MB from Ouchi Shinko Chemical Industrial Co., Ltd.

(F) TNPP: (tris (nonylphenyl) phosphite): Nocrac TNP from Ouchi Shinko Chemical Industrial Co., Ltd.

Comparative Example 1

Relative to 100 parts by mass of the fluoroelastomer A, 2 parts by mass of the polyhydroxy aromatic compound (bisphenol AF) and 0.4 parts by mass of the quaternary phosphonium salt (BTPPC) were kneaded in an open roll followed by addition of magnesium oxide, calcium hydroxide, carbon black and carnauba wax so as to obtain the ratio shown in Table 1 and kneading in an open roll to prepare a fluoroelastomer composition. The crosslinking properties of the fluoroelastomer composition were measured according to the following methods.

The obtained fluoroelastomer composition was charged and pressed for crosslinking in molding metal dies for sheet for physical property tests and for O-ring at a temperature and time shown in Table 1 and further heated in an oven at a temperature and time shown in Table 1, thereby obtaining a sheet (crosslinked rubber sheet) for physical property tests having the size 120 mm×140 mm×2 mm-thickness and an O-ring of the size of P-24.

The obtained crosslinked rubber sheet was measured for properties according to the following methods. Results are shown in Table 1.

<Vulcanization Property>

The crosslinking curve of the fluoroelastomer composition was measured on the JSR curastmeter Type II at a crosslinking temperature shown in Table 1 to determine the induction time (T10), 90% crosslinking time (T90), minimum torque (ML) and maximum torque (MH).

<Properties at Normal Condition>

According to JIS K6251 using the dumbbell No. 6, the O-ring was measured for the tensile stress at 100% elongation (M100), tensile strength (MPa), elongation (%) and hardness peak (shore A). In addition, according to JIS K6253, the molded article was measured for the hardness (shore A) after 3 seconds.

<Compression Set (CS)>

According to JIS B2401, the compression set was measured at 200° C. for 70 hours at 25% compression.

<Molding Defects>

A P-8 size O-ring metal die (providing 5×13=65 O-rings) was used for pressing at a temperature and time shown in Table 1 to obtain O-rings, which were then observed on the surface with a magnifier of ×10.

oo: No unvulcanized portion is observed.

o: A few (1 to 3) unvulcanized portions are observed.

Δ: Several (4 to 9) unvulcanized portions are observed.

x: Many (10 or more) unvulcanized portions are observed.

Examples 1 to 11 and Comparative Example 2

Fluoroelastomer compositions were prepared in the similar manner as Comparative Example 1 except that the antioxidants shown in Tables 1 and 2 were used or the fluoroelastomer B was used instead of the fluoroelastomer A, which were then molded to obtain sheets for physical property tests and O-rings. The results are shown in Tables 1 and 2.

TABLE 1

| | Comparative Example 1 | Example 1 | Example 2 | Example 3 | Example 4 | Example 5 | Example 6 | Example 7 | Example 8 |
|---|---|---|---|---|---|---|---|---|---|
| Formulation (parts by mass) | | | | | | | | | |
| Fluoroelastomer A | 100 | 100 | 100 | 100 | 100 | 100 | 100 | 100 | 100 |
| Bisphenol AF | 2 | 2 | 2 | 2 | 2 | 2 | 2 | 2 | 2 |
| BTPPC | 0.4 | 0.4 | 0.4 | 0.4 | 0.4 | 0.4 | 0.4 | 0.4 | 0.4 |
| Magnesium oxide | 3 | 3 | 3 | 3 | 3 | 3 | 3 | 3 | 3 |
| Calcium hydroxide | 6 | 6 | 6 | 6 | 6 | 6 | 6 | 6 | 6 |
| Carbon black | 20 | 20 | 20 | 20 | 20 | 20 | 20 | 20 | 20 |
| Carnauba wax I | 0.5 | 0.5 | 0.5 | 0.5 | 0.5 | 0.5 | 0.5 | 0.5 | 0.5 |
| (A) BHT | — | 0.10 | 0.20 | 1.00 | — | — | — | — | — |
| (B) TMDQ | — | — | — | — | 0.20 | — | — | — | — |
| (C) MBMBP | — | — | — | — | — | 0.20 | — | — | — |
| (D) DPPD | — | — | — | — | — | — | 0.20 | — | — |
| (E) MBI | — | — | — | — | — | — | — | 0.20 | — |
| (F) TNPP | — | — | — | — | — | — | — | — | 0.20 |
| Vulcanization property (curastmeter Type II, 170° C.) | | | | | | | | | |
| ML (N) | 2.5 | 2.3 | 2.2 | 1.9 | 2.3 | 2.3 | 2.3 | 2.3 | 2.2 |
| MH (N) | 40.2 | 42.4 | 40.2 | 38.2 | 42.1 | 42.1 | 40.7 | 37.2 | 40.7 |
| T10 (min) | 2.3 | 2.3 | 2.0 | 2.0 | 2.2 | 2.2 | 2.2 | 2.1 | 2.3 |
| T90 (min) | 3.2 | 3.2 | 2.8 | 2.8 | 3.0 | 3.3 | 3.3 | 3.1 | 3.5 |
| Vulcanization condition | | | | | | | | | |
| Press vulcanization | 170° C. × 10 minutes | | | | | | | | |
| Oven vulcanization | 230° C. × 24 hours | | | | | | | | |
| Properties at normal condition | | | | | | | | | |
| Tensile stress at 100% elongation (MPa) | 5.0 | 4.9 | 5.2 | 6.0 | 6.2 | 5.2 | 5.2 | 4.9 | 5.1 |
| Tensile strength (MPa) | 13.6 | 15.5 | 14.8 | 14.1 | 16.1 | 14.0 | 16.0 | 14.7 | 15.5 |
| Elongation (%) | 260 | 260 | 250 | 200 | 240 | 230 | 250 | 260 | 270 |
| Hardness peak (SHORE A) | 73 | 73 | 73 | 74 | 74 | 73 | 73 | 74 | 72 |
| Hardness after 3 seconds (SHORE A) | 68 | 68 | 68 | 68 | 69 | 68 | 68 | 69 | 68 |
| CS (200° C. × 70 hours) | | | | | | | | | |
| P-24 O-Ring (%) | 15 | 16 | 16 | 19 | 18 | 18 | 13 | 20 | 16 |
| Molding defects | | | | | | | | | |
| P-8 O-ring | x | ○ | ○○ | ○○ | ○ | ○○ | ○ | ○ | Δ |

TABLE 2

| | Comparative Example 2 | Example 9 | Example 10 | Example 11 |
|---|---|---|---|---|
| Formulation (parts by mass) | | | | |
| Fluoroelastomer B | 100 | 100 | 100 | 100 |
| Bisphenol AF | 2 | 2 | 2 | 2 |
| BTPPC | 0.65 | 0.65 | 0.65 | 0.65 |
| Magnesium oxide | 3 | 3 | 3 | 3 |
| Calcium hydroxide | 6 | 6 | 6 | 6 |
| Carbon black | 20 | 20 | 20 | 20 |
| Carnauba wax I | 0.5 | 0.5 | 0.5 | 0.5 |
| (A) BHT | — | 0.10 | 0.20 | 1.00 |
| Vulcanization property (curastmeter Type II, 170° C.) | | | | |
| ML (N) | 2.2 | 2.2 | 2.2 | 2.1 |
| MH (N) | 32.3 | 32.0 | 31.8 | 31.0 |
| T1O (min) | 1.8 | 1.8 | 1.8 | 1.7 |
| T9O (min) | 3.4 | 3.4 | 3.3 | 3.2 |
| Vulcanization condition | | | | |
| Press vulcanization | 170° C. × 10 minutes | | | |
| Oven vulcanization | 230° C. × 24 hours | | | |
| Properties at normal condition | | | | |
| Tensile stress at 100% elongation (MPa) | 4.5 | 4.5 | 4.7 | 4.9 |
| Tensile strength (MPa) | 15.8 | 15.6 | 16.3 | 14.9 |
| Elongation (%) | 280 | 280 | 270 | 250 |
| Hardness peak (SHORE A) | 69 | 69 | 69 | 70 |
| Hardness after 3 seconds (SHORE A) | 65 | 65 | 64 | 65 |
| CS (200° C. × 70 hours) | | | | |
| P-24 O-Ring (%) | 30 | 30 | 31 | 34 |
| Molding defects | | | | |
| P-8 O-ring | X | ○ | ○○ | ○○ |

INDUSTRIAL APPLICABILITY

The fluoroelastomer composition of the present invention can be suitably used for production of sealing materials, fuel hoses and the like.

The invention claimed is:
1. A fluoroelastomer composition comprising:
a polyol-crosslinkable fluoroelastomer,
a polyhydroxy aromatic compound,
a quaternary phosphonium salt,
a divalent metal oxide and/or divalent metal hydroxide and a phenolic antioxidant is an amount of 0.2 parts by mass or more per 100 parts by mass of the fluoroelastomer.

2. The fluoroelastomer composition according to claim 1, wherein the polyhydroxy aromatic compound is 2,2-bis(4-hydroxyphenyl)perfluoropropane.

3. The fluoroelastomer composition according to claim 1, wherein the quaternary phosphonium salt is at least one selected from the group consisting of benzyltriphenylphosphonium chloride and 2,2-bis(4-hydroxyphenyl)perfluoropropane salt of benzyltriphenylphosphonium.

4. The fluoroelastomer composition according to claim 1, wherein the antioxidant is contained at less than 0.5 parts by mass relative to 100 parts by mass of the fluoroelastomer.

5. A molded article obtained with the fluoroelastomer composition according to claim 1.

6. The molded article according to claim 5, which is a sealing material.

* * * * *